(12) United States Patent
Gambhir et al.

(10) Patent No.: US 12,346,855 B2
(45) Date of Patent: Jul. 1, 2025

(54) HOT DESK DEVICE AND METHOD FOR HYBRID ENVIRONMENT

(71) Applicant: Microsoft Technology Licensing, LLC, Redmond, WA (US)

(72) Inventors: Prerana Dharmesh Gambhir, San Jose, CA (US); Prayank Mathur, Redmond, WA (US); Ashish Mehta, Redmond, WA (US); Kruthika Ponnusamy, Redmond, WA (US); Sandhya Rajendra Rao, Bellevue, WA (US); Sarah Leslie Sutton, Auburn, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 337 days.

(21) Appl. No.: 17/842,529

(22) Filed: Jun. 16, 2022

(65) Prior Publication Data

US 2023/0410005 A1 Dec. 21, 2023

(51) Int. Cl.
*G06F 7/04* (2006.01)
*G06F 21/31* (2013.01)
*G06Q 10/0631* (2023.01)

(52) U.S. Cl.
CPC ....... *G06Q 10/06312* (2013.01); *G06F 21/31* (2013.01)

(58) Field of Classification Search
CPC .......................... G06Q 10/06312; G06F 21/31

(Continued)

(56) References Cited

U.S. PATENT DOCUMENTS

| 10,367,687 B1 | 7/2019 | Söderlind et al. |
| 10,587,616 B2 | 3/2020 | Lewis et al. |

(Continued)

FOREIGN PATENT DOCUMENTS

WO 2020091980 A1 5/2020

OTHER PUBLICATIONS

"International Search Report and Written Opinion Issued in PCT Application No. PCT/US23/022877", Mailed Date: Sep. 18, 2023, 12 Pages.

(Continued)

*Primary Examiner* — Brandon Hoffman
*Assistant Examiner* — Samuel Ambaye
(74) *Attorney, Agent, or Firm* — NovoTechIP International PLLC

(57) ABSTRACT

A shared computer device configured to receive a reservation request associated with a user at the shared computer device to reserve a predetermined period of time for usage of the shared computer device, receive an input from the user on the shared computer device during the predetermined period of time to sign in to and use the shared computer device to access and use a predetermined application, based on the signing in, downloading, from a server, predetermined personal information of the user stored in the server regarding the predetermined application and granting access to the user to use the predetermined application on the shared computer device during the predetermined period of time using the downloaded personal information of the user, and delete the personal information of the user from the shared computer device after the predetermined period of time expires.

21 Claims, 12 Drawing Sheets

(58) Field of Classification Search
USPC .......................................................... 726/2
See application file for complete search history.

(56) References Cited

U.S. PATENT DOCUMENTS

| | | | |
|---|---|---|---|
| 11,367,120 | B2 | 6/2022 | Gupta et al. |
| 11,729,274 | B2 | 8/2023 | Rao et al. |
| 2004/0205157 | A1 | 10/2004 | Bibelnieks et al. |
| 2008/0209050 | A1 | 8/2008 | Li |
| 2008/0222546 | A1 | 9/2008 | Mudd et al. |
| 2013/0097626 | A1 | 4/2013 | Rajagopal et al. |
| 2013/0160110 | A1* | 6/2013 | Schechter ............ G06F 21/629 726/19 |
| 2013/0346494 | A1 | 12/2013 | Nakfour |
| 2016/0105472 | A1 | 4/2016 | Chitroda et al. |
| 2016/0119438 | A1* | 4/2016 | Abramson ....... H04N 21/41407 709/217 |
| 2018/0337967 | A1 | 11/2018 | Ritchie et al. |
| 2018/0374138 | A1 | 12/2018 | Mohamed |
| 2020/0104762 | A1* | 4/2020 | Gibson ................... H04W 4/80 |
| 2020/0394570 | A1* | 12/2020 | Ge ......................... G06Q 10/02 |
| 2021/0127436 | A1 | 4/2021 | Smets et al. |
| 2022/0327438 | A1* | 10/2022 | Bach .................... G06K 7/1417 |
| 2022/0374781 | A1 | 11/2022 | Wang et al. |
| 2023/0224373 | A1 | 7/2023 | Rao et al. |
| 2024/0004737 | A1 | 1/2024 | Rossi |

OTHER PUBLICATIONS

U.S. Appl. No. 17/852,757, filed Jun. 29, 2022.
U.S. Appl. No. 17/573,433, filed Jan. 11, 2022.
U.S. Appl. No. 17/308,000, filed May 4, 2021.
"AirPlay Discovery in Apple Devices", Retrieved from: https://web.archive.org/web/20211005211323/https://support.apple.com/en-in/guide/deployment-reference-ios/apd19d206cc7/web, Dec. 14, 2020, 2 Pages.
"AirPlay Security in Apple Devices", Retrieved from: https://web.archive.org/web/20211006095822/https://support.apple.com/en-in/guide/deployment-reference-ios/apd40ab73b35/web, Dec. 14, 2020, 1 Page.
"Guest Mode", Retrieved from: https://developers.google.com/cast/docs/guest_mode, Jun. 2, 2021, 4 Pages.
Páez, et al., "An Architecture for Biometric Electronic Identification Document System Based on Blockchain", In the Journal of Future Internet, Jan. 11, 2020, 19 Pages.
Racoma, J. A., "Chromecast to use Ultrasonic Tones for Authentication: A New Trend in Wireless Communication?", Retrieved from: https://www.androidauthority.com/chromecast-use-ultrasonic-tones-authentication-newtrend-wireless-communication-398620/, Jun. 27, 2014, 3 Pages.
Sabadello, et al., "Introduction to DID Auth", In a White Paper from Rebooting the Web of Trust VI, Jul. 26, 2018, pp. 1-31.
"International Search Report and Written Opinion Issued in PCT Application No. PCT/US22/048127", Mailed Date: Feb. 6, 2023, 11 Pages.
"Notice of Allowance Issued in U.S. Appl. No. 17/573,433", Mailed Date : Mar. 13, 2023, 9 Pages.
"Getting started with Zoom Device Management", Retrieved From: https://support.zoom.us/hc/en-us/articles/360032285752, Dec. 15, 2021, 2 Pages.
"Getting started with Zoom Rooms Appliances", Retrieved From: https://support.zoom.us/hc/en-us/articles/360039376751, Mar. 10, 2022, 2 Pages.
"Hot desking", Retrieved From: https://web.archive.org/web/20210408155146/https://www.ringcentral.com/office/features/hot-desking/overview.html, Apr. 8, 2021, 3 Pages.
"Prepare offices for hybrid work with new experiences on Microsoft Teams Rooms and Teams devices", Retrieved From: https://techcommunity.microsoft.com/t5/microsoft-teams-blog/prepare-offices-for-hybrid-work-with-new-experiences-on/ba-p/2709599, Sep. 9, 2021, 9 Pages.
"Using hot desking for phones", Retrieved From: https://support.zoom.us/hc/en-us/articles/360043841032-Using-hot-desking-for-phones, Jun. 9, 2022, 3 Pages.
Herskowitz, Nicole, "Brace yourselves: Hybrid work is hard. Here's how Microsoft Teams and Office 365 can help", Retrieved From: https://www.microsoft.com/en-us/microsoft-365/blog/2021/09/09/brace-yourselves-hybrid-work-s-hard-heres-how-microsoft-teams-and-office-365-can-help/, Sep. 9, 2021, 10 Pages.
"Calls and devices", Retrieved From: https://web.archive.org/web/20220611181748/https://support.microsoft.com/en-us/office/calls-and-devices-4d96653e-6176-4978-98ab-2c19df137e43, Jun. 11, 2022, 1 Page.
"What's New in Microsoft Teams", Retrieved From: https://techcommunity.microsoft.com/t5/microsoft-teams-blog/what-s-new-in-microsoft-teams-december2021/ba-p/3050099#:~:text=Hot%20desking%20on%20Microsoft%20Teams,access%20their%20personalized%20Teams%20experience, Jan. 3, 2022, 13 Pages.

* cited by examiner

HOT DESK DEVICE AND METHOD FOR HYBRID ENVIRONMENT

BACKGROUND

With the recent advancements of communications and IT technologies, including those recently developed due to the need for workers to work remotely, if possible, because of the restrictions and concerns brought about by the Covid pandemic, for example, more and more workers can perform tasks virtually everywhere. Another issue brought about by the Covid pandemic is that many companies decreased the number of permanent desks available to their workers due to real estate liquidation (space is a commodity). Therefore, in many cases, if employees go to the office, they may now have to carry in their own work items (laptops, monitors, etc.) if they want to do work in the office. Nowadays, many workers work in a so-called hybrid environment in which they either want to or are required to mix working remotely at home or any desired location and commuting to workspaces in the office. Hence, it became less important for workers to have physical offices and their own designated work-related devices (e.g., a computer, monitor, telephone, etc.). As a result of the above-noted developments, many organizations have implemented workspace hoteling services, referred to as hot desking, which provide a temporary office space or shared work-related devices (e.g., a shared computer, monitor, telephone, printer, etc.) at designated location or locations. With hot-desking an employee effectively just needs to bring their mobile phone (no need for laptop, charger, etc.).

When a user walks into such workspace hot desking service locations, the user is provided with or allowed to select a shared hot desk device (e.g., a desktop, laptop, etc.). The user may then provide his or her user credentials (e.g., a login ID, password, PIN, etc.) to login to the shared hot desk device. Based on the user credentials, a backend system (e.g., a server, storage, etc.) may retrieve and apply a user-specific setting to a user session on the shared hot desk device. However, a technical problem exists in that hot desking in a hybrid work environment is currently not seamless or well-integrated with existing applications, systems and services. In order to provide for efficient use of such hot desking arrangements, it is necessary to provide a technical solution for hot desking scheduling that allows users to quickly locate, reserve, and configure hot desk devices in flexible workspaces either on the hot desk devices themselves or from remote devices.

SUMMARY

In an implementation, a shared computer device includes a processor and a computer-readable medium in communication with the processor and storing instructions that, when executed by the processor, cause the processor to perform: receiving a reservation request associated with a user at the shared computer device to reserve a predetermined period of time for usage of the shared computer device; receiving an input from the user on the shared computer device during the predetermined period of time to sign in to and use the shared computer device to access and use a predetermined application; based on the signing in, downloading, from a server, predetermined personal information of the user stored in the server regarding the predetermined application and granting access to the user to use the predetermined application on the shared computer device during the predetermined period of time using the downloaded personal information of the user; and deleting the personal information of the user from the shared computer device after the predetermined period of time expires.

In another implementation, a method performed by a shared computer device includes steps of receiving a reservation request associated with a user at the shared computer device to reserve a predetermined period of time for usage of the shared computer device, receiving an input from the user on the shared computer device during the predetermined period of time to sign in to and use the shared computer device to access and use a predetermined application, based on the signing in, downloading, from a server, predetermined personal information of the user stored in the server regarding the predetermined application and granting access to the user to use the predetermined application on the shared computer device during the predetermined period of time using the downloaded personal information of the user, and deleting the personal information of the user from the shared computer device after the predetermined period of time expires.

In another implementation, a non-transitory computer-readable medium includes instructions that, when executed by a processor, cause the processor to control a system to perform receiving a reservation request associated with a user at the shared computer device to reserve a predetermined period of time for usage of the shared computer device, receiving an input from the user on the shared computer device during the predetermined period of time to sign in to and use the shared computer device to access and use a predetermined application, based on the signing in, downloading, from a server, predetermined personal information of the user stored in the server regarding the predetermined application and granting access to the user to use the predetermined application on the shared computer device during the predetermined period of time using the downloaded personal information of the user, wherein signing into the shared computer device provides the user with one-click access to services and capabilities of the predetermined application on the shared computer device, and deleting the personal information of the user from the shared computer device after the predetermined period of time expires.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
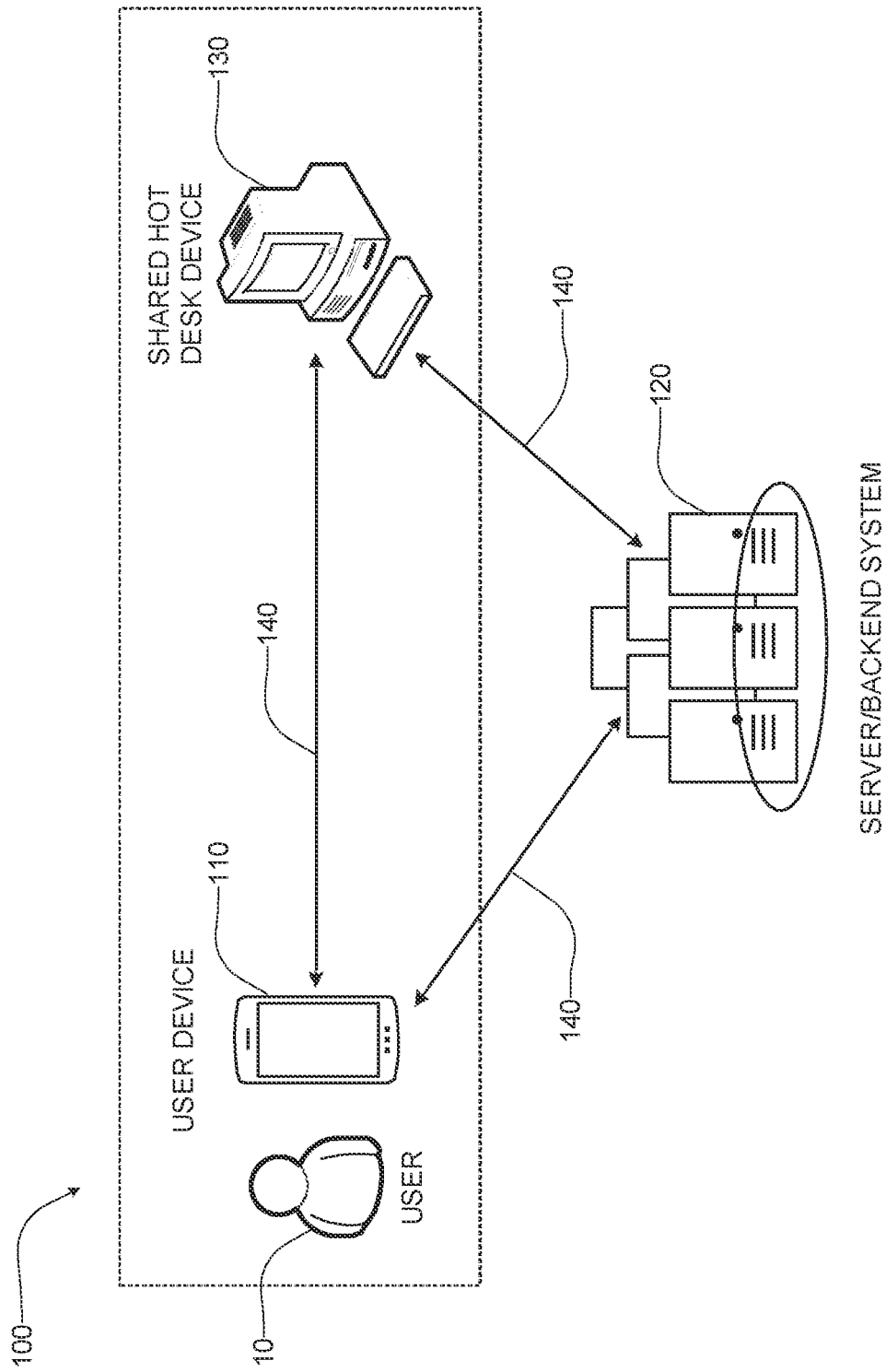
FIG. 1 illustrates an example system for conducting a user session on a shared hot desk device in accordance with aspects of the present disclosure.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

This description is directed to addressing the technical problem that hot desking in a hybrid work environment is currently not seamless or well-integrated with existing applications, systems and services. To that end, the present disclosure provides a technical solution allowing hot desking scheduling that allows users to quickly locate, reserve, and configure shared hot desk devices in flexible workspaces from remote devices or on the hot desk devices themselves. In particular, implementations provided herein for reserving the flexible workspace for a predetermined period of time are combined with being able to sign in on the hot desk device to have immediate temporary access to personal information of a particular application downloaded from a server, such as a user's Microsoft Teams™, so that one-click operations are possible by the user with regard to the particular application without having to sign-in again to that application. For example, once the user has signed into the hot desk device, based on their advance reservation, they can have one-click access to meetings in the application by clicking on an instant meeting button on the GUI of the hot desk device. In conjunction with such technical advantages, all of the user's personal information is automatically deleted at the end of the reserved session, providing a further technical advantage of added security for the user. Still further, the performance and the audio/video capabilities of hot desking devices provided in an office are generally far superior to those of typical user devices used by employees in their home environments since the hot desking devices are generally very high-quality devices intended for long term usage by multiple employees.

Other implementations of the present disclosure include technical solutions such as the use of QR codes and physical proximity of a user device that the reservation was originally remotely made on as alternative ways to authenticate the user during signing into a shared hot desk workspace. Other technical solutions include the use of AI (artificial intelligence) to personalize a user experience where a ML (machine learning) model learns user preferences over time, e.g., lowest available floor, a 'window seat', additional booking dates/times, etc., based on prior observed user activities and selections. In regard to this, employees often come into the office for collaboration with other colleagues. Applications, such as Microsoft Teams™, can include a personalized organization chart for each employee so the application knows who the employee's immediate colleagues are and can therefore recommend hot desking workspace that is near the employee's immediate colleagues (if the employee's colleagues have also made a reservation for a hot desking workspace using their respective Microsoft Teams™ applications). Another feature is pairing the hot desk device with the user's own devices, with an interconnected locking/unlocking feature. In another implementation, even if a reservation for using the hot desk device is made remotely on a user device, the user device does not need to be in proximity to the hot desk device. This provides a technical advantage that the user does not need to bring their user device, on which the reservation was made in the first place, to the hot desk location in order for the user to sign in and use the hot desk device to achieve one-click access to features of a particular application without having to sign in separately to the particular application after initial sign into the hot desk device. This is advantageous, for example, in situations where the reservation was originally made on a user device other than the user's mobile phone (which, of course, can be used to make a reservation if the mobile phone is enabled to make reservations using the application).

With this overview, attention is now turned to the figures to describe various implementations of the presenting teachings. FIG. 1 illustrates an example system 100 for allowing a user to make a reservation and, optionally, to sign into a user session on a shared hot desk device 130 during a specific reservation period. The system 100 may include a user device 110, a server/backend system 120, and a shared hot desk device 130, and/or the like, each of which may be connected to some of or all the others via a suitable communication link or links 140.

The user device 110 may be a mobile device, such as a smart phone, laptop computer, tablet computer, wearable computer, as well as any variation or combination thereof. The user device 110 may be associated with and configured for an exclusive use by a particular user 10. The user device 110 may operate remotely from and communicate with the server 120 by way of data and information exchanged over the link 140. The user device 110 may also be configured to conduct some of the functions for allowing the user 10 to make a reservation for a user session using the shared hot desk device 130 and, if desired, authenticate the user to sign into the user session. The user device 110 may include a display (not shown), which may display a graphical user interface (GUI) for the local service or other software tools. The local service may be implemented as a locally installed and executed application, streamed application, mobile application, or any combination or variation thereof. Alternatively, the local service may be implemented as part of an operating system (OS), such as Apple™ iOS™, Google™ Android™, Google™ Chrome OS™, etc. The local service may be implemented as a standalone application or may be distributed across multiple applications.

The server/backend system 120 (hereinafter "server 120") is representative of any physical or virtual computing system, device, or collection thereof, such as, a web server, rack server, blade server, virtual machine server, or tower server, as well as any other type of computing system, which may, in some scenarios, be implemented in a data center, a virtual data center, or some other suitable facility. The server 120 may host, be integrated with, or be in communication with various data sources and processing resources, such as, databases, data processing devices, data storages, search engines, etc. The server 120 may host a user session support service configured to provide functions and resources for the user 10 to conduct a user session using the shared hot desk device 130. The user session support service may be any software application, module, component, or collection thereof. The server 120 may store or access a default user session setting, for example, an automatic logout setting, communication control setting, file access control setting, etc. When the user 10 is authenticated, the server 120 may control the shared hot desk device 130 to establish a user session based on the default user session setting associated with the user 10. In particular, the server 120 includes stored personal information of the user 10 for particular applications, such as, but not limited to, personal data of the user in applications including meeting capabilities and a calendar UI, such as Microsoft Teams™. In an implementation, the user session support service may be a remote desktop service which allows the user's desktop environment to be run on the shared device 130.

The shared hot desk device 130 may be configured to perform some of the functions for allowing the user 10 to conduct a user session on the shared hot desk device 130. The shared hot desk device 130 may not be associated with any particular user and may be configured to be usable for a user session by any authenticated user with appropriate access privileges. As will be discussed below, the hot desk device 130 may also be configured to access a room/desk account with basic features such as ad hoc (instant) meetings, dial pad, etc., without the need for the user to sign in or to be authenticated on the hot desk device 130. For example, the user can click an instant meeting button on the home screen of the hot desk device 130, without having to either sign in of authenticate, to create a meeting. Specifically, after clicking the instant meeting button, the user can enter a name for an instant meeting and invite participants to the newly created meeting. On the other hand, if the user does sign in and authenticate, they can not only create one click meetings, but they can also join meetings that are sent to the user's meeting or calendar application (e.g., Microsoft Teams™ or Microsoft Outlook™) without having to specifically sign in again to the meeting application. Furthermore, the meeting application is personalized to the user with the user's information.

The shared hot desk device 130 may be a physical or virtual computing system, device, or collection thereof, such as a desktop computer, laptop computer, hybrid computer, tablet computer, gaming machine, smart television, entertainment device, Internet appliance, or virtual machine, as well as any variation or combination thereof. The shared hot desk device 130 may operate remotely from the server 120, and hence the shared hot desk device 130 and the server 120 may communicate with each other by way of data and information exchanged over a suitable communication network or link 140.

The shared hot desk device 130 may host a user session service, which is representative of any software application, module, component, or collection thereof, capable of allowing the user 10 to conduct a user session. The user session service may operate independently from or as part of a software tool for allowing the user 10 to confirm the user's proximity, authenticate the user, conduct a user session, customize the default user session setting, etc. The shared hot desk device 130 may include or be connected to a display, which may display a graphical user interface (GUI) for the user session service or the software tool. The user session service may be implemented as a locally installed and executed application, streamed application, mobile application, or any combination or variation thereof, which may be configured to conduct operations or functions related to allowing the user to conduct a user session and customize a user session setting. Alternatively, the user session service may be implemented as part of an operating system (OS), such as Microsoft™ Windows™ Apple™ iOS™, Linux™, Google™ Chrome OS™, etc. The user session service may be implemented as a standalone application or may be distributed across multiple applications.

The server 120 may determine, based on user information, for example, an access privilege associated with the user 10, etc., a default user session setting, which may be automatically applied to a user session, once the user has signed into a hot desk device 130, regardless of which device is being used to establish the user session. The default user session setting may define how a user session should be implemented, for example, an automatic logout setting (e.g., whether a user should be automatically logged out from the current user session if an inactivity is detected for a predetermined or user-defined time period, etc.), communication control setting (e.g., whether a user should be able to make or receive external calls or video calls, etc., during the current user session), file access control setting (e.g., whether a user should be able to read, edit, delete or create a file during the current user session, etc.), browser control setting (e.g., whether a bookmark or browsing history should be synced for the current user session, whether the browser cache should be cleared out upon logging out from the current user session, etc.), and/or the like.

Figure 2:
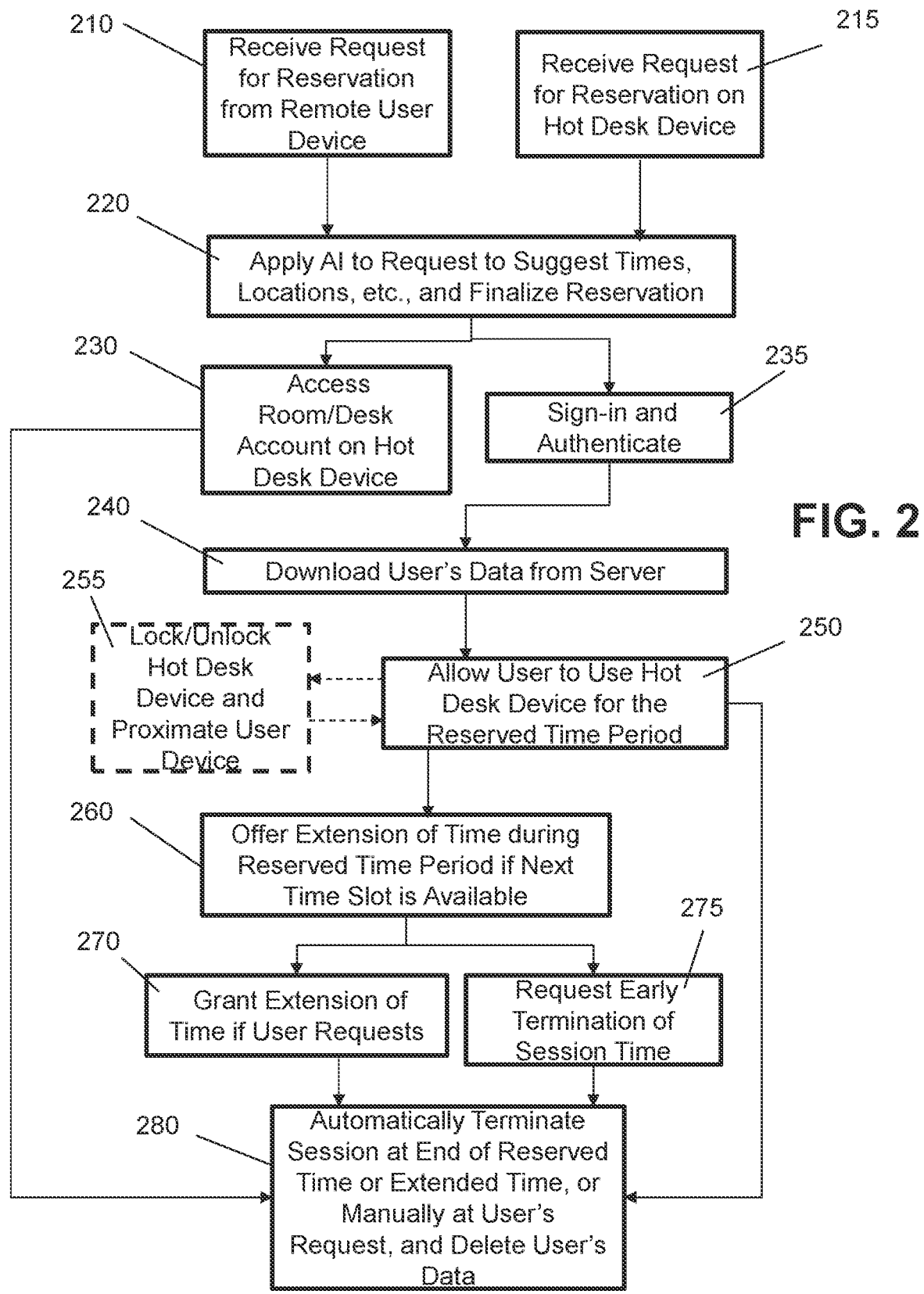
FIG. 2 illustrates an example of operations of the system for making reservations on the shared hot desk device, signing into the shared hot desk device and available options during the reserved time, including locking and requesting extension of time in accordance with aspects of the present disclosure.

FIG. 2 illustrates an example of operations of the system for making reservations on the shared hot desk device 130 of FIG. 1, signing into the shared hot desk device and available activity options during the reserved time, including coordinated locking/unlocking of the shared user device and a proximate user device, and requesting an extension of time in accordance with aspects of the present disclosure. Referring to FIG. 2, the shared hot desk device 130 can either receive a request for a reservation from a user 10 from the remote user device 110 (e.g., step 210) or, alternatively, can receive a request for a reservation from the user 10 directly on the hot desk device 130 (e.g., step 215). In the case of requesting a reservation using the remote user device (step 210), this reservation request can be made, for example, from a calendar application which is on the user device, including, for example, the user's Microsoft Outlook™ calendar. Alternatively, the reservation request can be an application which includes meeting capabilities, such as Microsoft Teams™.

At step 220, artificial intelligence (AI) can be applied to the request by the server 120 or the hot desk device 130 itself in order to suggest times, locations for particular shared hot desk devices, preferred seating locations, alternate shared hot desk devices if a requested one is already reserved, etc. In other words, at step 220, machine learning (ML) can be used to make such suggestions based on an analysis of previous requests or other information known about the user, the user's associates, or the requested shared hot desk devices. In an alternative implementation, the AI and/or ML can be applied to the request by programming provided in the user device 110. The user 10 can then finalize the reservation time and place in step 220 after having considered any suggestions made by the AI analysis.

After suggestions have been made to the user in step 220, when the user arrives at the reserved hot desk device 130 at the reserved time, they can either access a room/desk account to use certain features of the hot desk device, without signing in and authenticating, in step 230, or the user can sign into the hot desk device 130 (step 235). Authentication of the user 10 can be done either from the user device 110, for example, the user device used to make the reservation remotely or another user device, (step 230) or directly on the hot desk device 130 itself (step 235). If the user has a user device 110 in proximity to the hot desk device 130, the user device 110 can be paired with the hot desk device 130, if desired, by the user manually taking steps with appropriate programming, such as Microsoft Better Together™, to achieve such pairing. This provides the technical advantage of allowing the two devices to operate together to work on projects or to provide separate audio and visual services during meetings, for example, using an application with meeting capabilities, such as Microsoft Teams™. Also, other user devices, such as Bluetooth™ headphones, etc., can be manually paired with the hot desk device either pre-sign-in, for example, using a share mode, or after signing in, using a personal mode, if desired.

After a successful sign in, the hot desk device 130 requests a download of the user's data from the server 120 (step 240). In step 250, this downloaded user's data will be used by the user 10 during the reserved time period for usage activities on the hot desk device 130 in order to perform desired functions with regard to one or more applications which are made available to the user 10 on the hot desk device 130. Examples of various activities which can be performed on the hot desk device 130 during the reserved time in step 250 will be discussed in more detail hereinafter.

In further regard to step 250, as mentioned above, once the user signs in, the user's private information for customizing a particular application, such as an application that has meeting and calendar capabilities (e.g., such as Microsoft Teams™), can be downloaded from the server 120 to the hot desk device 130. This provides a technical advantage that, once the user has signed in, they can have one-click access to their personal information in the particular application. For example, the user can join into meetings with one-click of an instant meeting button in the particular application without have to perform a further login to the particular application.

In implementations, in step 255, it is possible to interlink locking/unlocking operations between the hot desk device 130 and a proximate user device 110 (if the user device is nearby, which, as mentioned previously, is not required for sign in or use of the hot desk device 130). For example, if the user decides to temporarily lock the hot desk device 130 during the reserved time, the proximate user device 110 can also be locked. Alternatively, if the proximate user device 10 is locked during the user session, the hot desk device 130 can also be locked. The same holds true for subsequent unlocking (e.g., the user device 110 and the hot device 130 will be unlocked together).

In implementations of the present disclosure, a user has the ability to request an extension of time during the reserved time period in response to an offer to extend, provided someone has not already reserved the next time slot, as shown in steps 260 and 270 of FIG. 2. Otherwise, after the reserved time has expired for the hot desking session, the session will be automatically terminated in step 280 of FIG. 2 if the user 10 does not request an extension of time. In the event that the next available time slot is available for extension, the user will be offered the option of extending the reserved session in step 260. If the user elects to accept the offer and request an extension of time during the reserved time period, the hot desk device 130 will receive the request for such an extended time in step 270, and the request will be granted. In either case, a user session will automatically be terminated in step 280 either after the extended time, if the extension of time is allowed in step 270, or at the end of the originally reserved time, if the extension request has not been made. Optionally, the user 10 has the option of ending a session early, as shown in step 275, if they do not need the entire time which they originally reserved.

To sign into the shared hot desk device 130 for a user session that has previously been reserved using the user device 110, the user 10 may approach the shared hot desk device 130, which may be configured to display a QR code on a display thereof when interacted with by the user for initiating the user session. The user 10 may then use the user device 110 that was originally used to make the reservation to capture the QR code or use another device that has the correct QR code.

Figure 3:
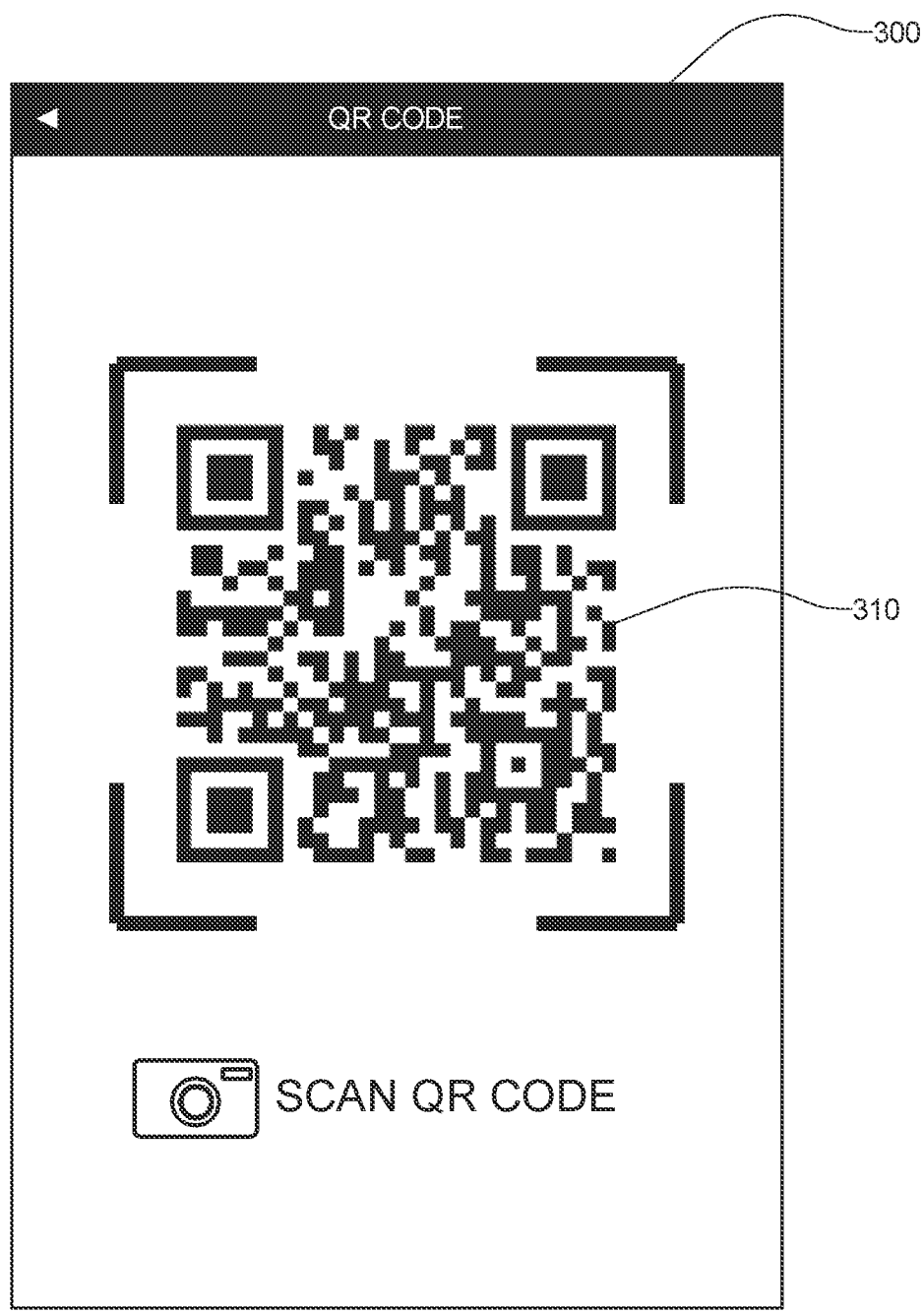
FIG. 3 illustrates an example graphical user interface (GUI) displayed on a user device for scanning a QR code displayed on a shared hot desk device in accordance with aspects of the present disclosure.

FIG. 3 illustrates an example GUI 300 rendered and displayed on the user device 110 for scanning a QR code 310 displayed on the shared hot desk device 130. The QR code 310 may contain an access code, which may include any number of characters arranged in any combination, which may be updated periodically or after each user session. Upon scanning the QR code 310, the user device 110 may extract the access code from the QR code 310 and display the extracted access code on the display thereof. The user 10 may then enter the displayed access code to the shared hot desk device 130, which may in turn compare the access code included in the QR code 310 and the access code entered by the user 10. Upon determining that these two access codes correspond to each other, the system 100 may confirm that the user 10 is physically proximate to the shared hot desk device 130. Alternatively, the user device 110 may transmit the extracted access code to the server 120 via a communication network (e.g., a Wi-Fi, mobile network, etc.). The server 120 may then determine whether the access code transmitted from the user device 110 corresponds to the access code included in the QR code 310 displayed at the shared hot desk device 130 to determine the user's proximity to the shared hot desk device 130.

Figure 4A:
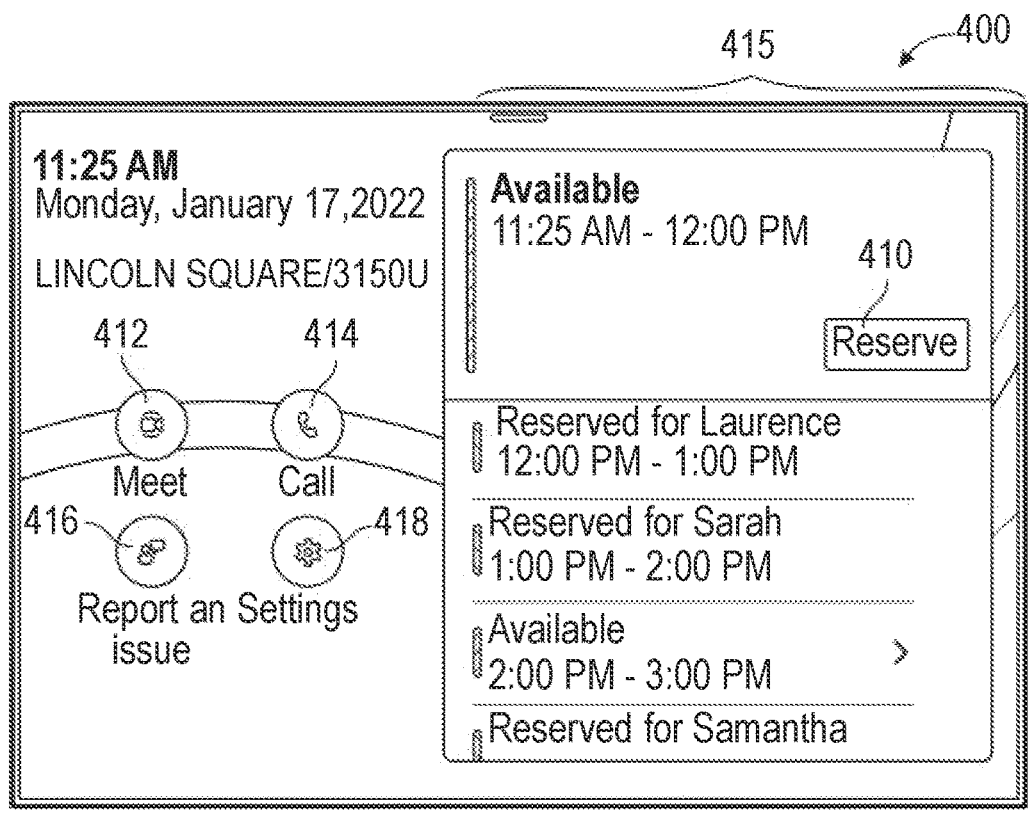
FIGS. 4A-4E illustrate examples of GUI displays for reservation procedures in accordance with aspects of the present disclosure.

FIGS. 4A-4E illustrate examples of GUI displays for reservation procedures in accordance with aspects of the present disclosure. Referring first to FIG. 4A, a home screen 400 on a GUI of the hot desk device 130 is shown. This home screen 400 is the default screen for the hot desk device 130 when the device is currently available (e.g., when it has not been reserved for the current time). As shown in FIG. 4A, this home screen 400 includes a reserve button 410, an instant meetings button 412, a phone call button 414, a report issue button 416 and a settings button 418. The home screen 400 also includes a reservation status section 415 which provides a user 10 with a display of the immediate availability the hot desk device 130. In the example shown in FIG. 4A the reservation status section 415 shows the current time availability (e.g., 11:25 AM-12:00 PM), as well as reservation status over the next several hours. For example, available time slots can be shown in one color, such as green, while already reserved time slots, which are therefore unavailable, can be shown in another color, such as purple or red. In implementations, the reservation status section 415 can be scrollable so that future times slots later in the day (or thereafter) can be checked by the user to see when the hot desking device is available to be reserved.

Figure 4B:
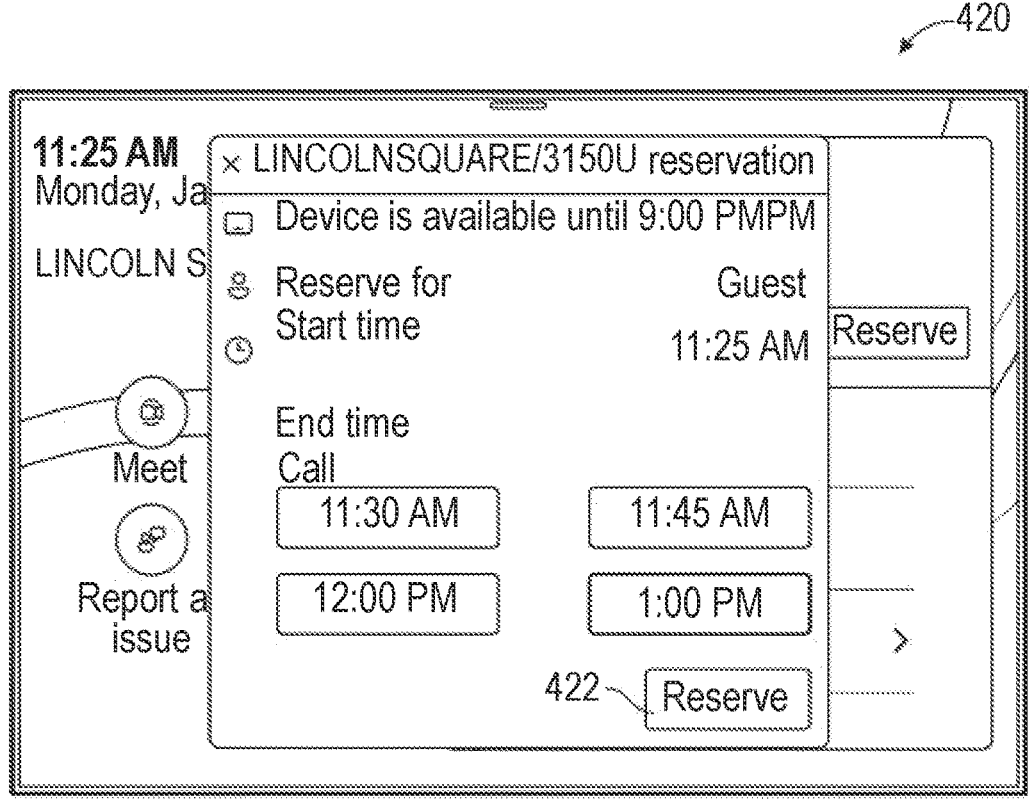
Figure 4C:
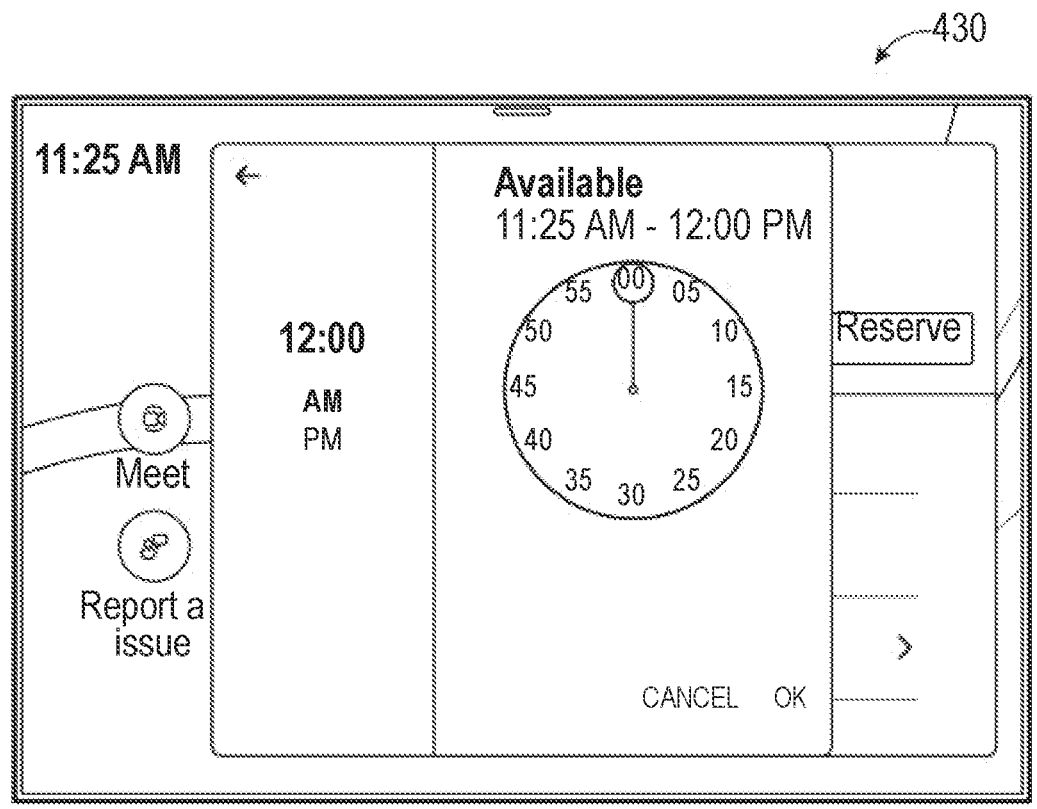

When a user 10 would like to make a reservation directly on shared hot desk device 130, the user can begin the process by clicking on the Reserve button 410 on the home screen 400. As shown in FIG. 4B, this will bring up the reservation modal dropdown selection screen 420 on the GUI display of the hot desk device 130. This reservation modal dropdown selection screen 420 allows the user to reserve in their name and to pick a desired start time and end time among available time slots. Available time slots can be shown, for example, in one color, while unavailable time slots, which have already been reserved, can be shown in another color. Once the user has entered their name, and selected available time, the user can then click on the reserve button 422 on the reservation modal dropdown selection screen 420. FIG. 4C shows a time picker screen 430 to pick a custom time rather than selecting suggested time slots, such as shown in FIG. 4B. The user can bring up the time picker screen 430 by clicking a custom button (not shown) on the reservation modal dropdown selection screen 420.

Figure 4D:
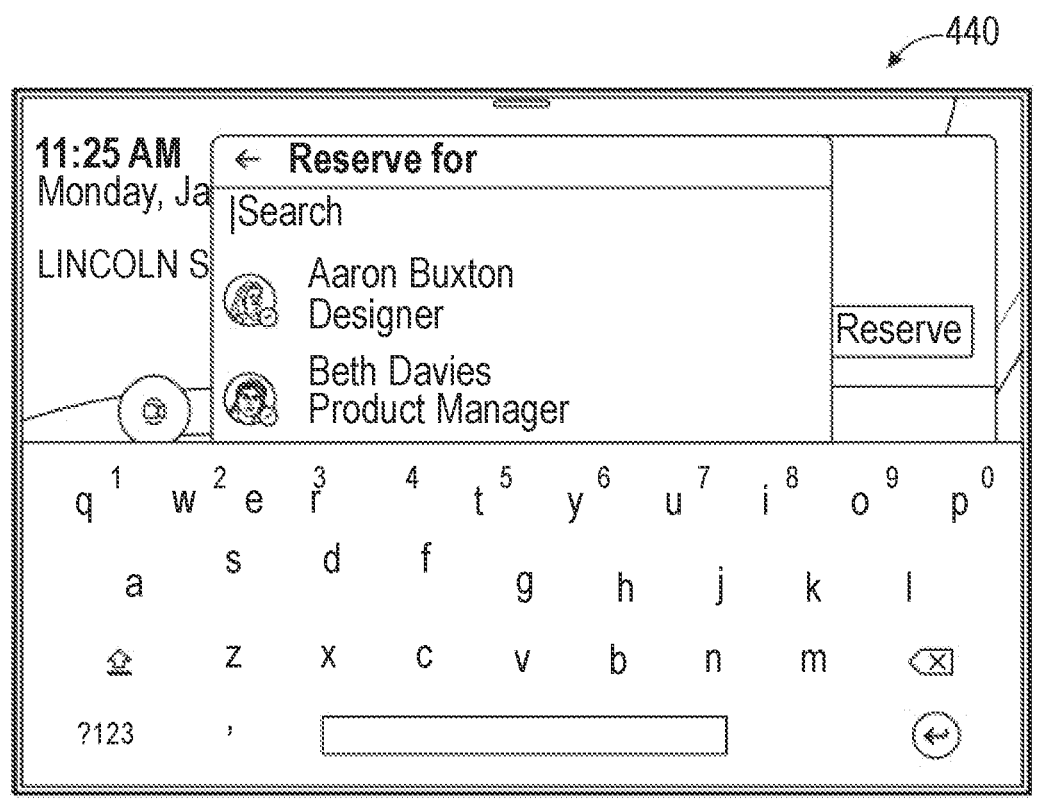

When the user clicks on "Guest" on the screen 420 of FIG. 4B, a keyboard/Global Access List screen 440 shown in FIG. 4D is displayed on the GUI of the hot desk device 130. The keyboard portion of the screen 440 allows the user to type in their name. If their name is on a Global Address List of an application stored in the server 120, such as Microsoft Teams™, an invitation will be sent to the user, for example, via their Microsoft Outlook™ or Microsoft Teams™ applications (for example, on their user devices). Also, once the user has requested a reservation for use of the hot desk device 130 based on their name being on a Global Address List for a particular application, this will allow the hot desk device 130 to download the application, including personal information of the user for customizing the application, when the user signs into the hot desk device 130 during the reserved time. This provides the technical advantage that the user can then have one-click access to the features of the application, such as instant meeting access, without having to provide multiple logins (e.g., without having to login to the hot desk device first, and then login to the particular application).

Figure 4E:
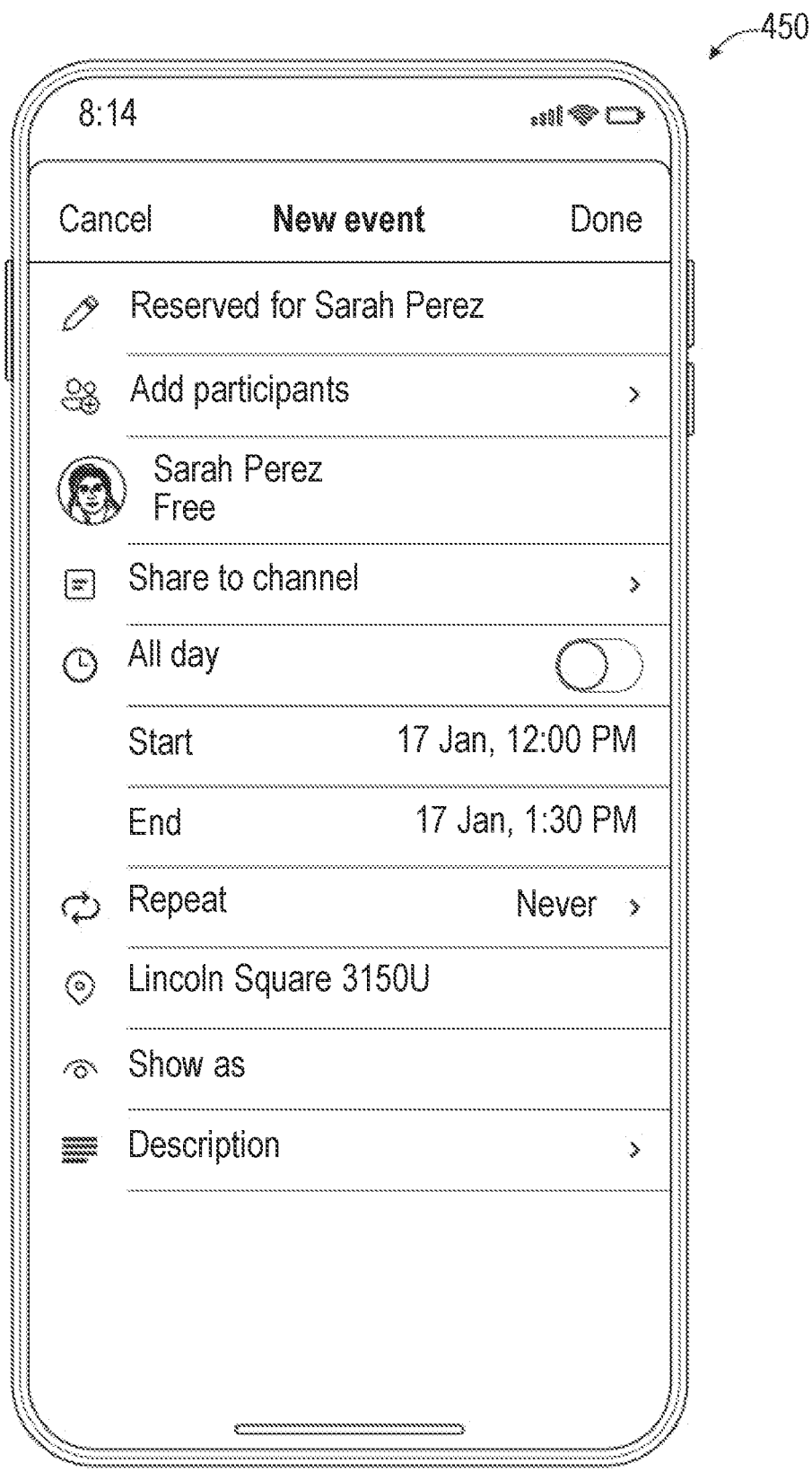

The above descriptions referring to FIGS. 4A-4D pertain to a user interface directly with the hot desk device 30 to make the reservation. However, reservations can also be made remotely by the user 10 using their own device 110. This is shown in FIG. 4E in which a reservation for a reserved time on a hot desk device 130 is set up remotely on a GUI of a mobile device 450. In the case of requesting a reservation using the remote user device (step 210 of FIG. 2), this reservation request can be made, for example, from a calendar application which is on the user device, including, for example, the user's Microsoft Outlook™ calendar. Alternatively, the reservation request can be an application which includes meeting capabilities, such as Microsoft Teams™. As also noted above with regard to step 220, the server 120, or the hot desk device 130 itself, can use machine learning (ML) and/or AI to make suggestions to the user regarding user preferences learned from previous reservations made by the user, or from other information known about the user or associates of the user.

Figure 5A:
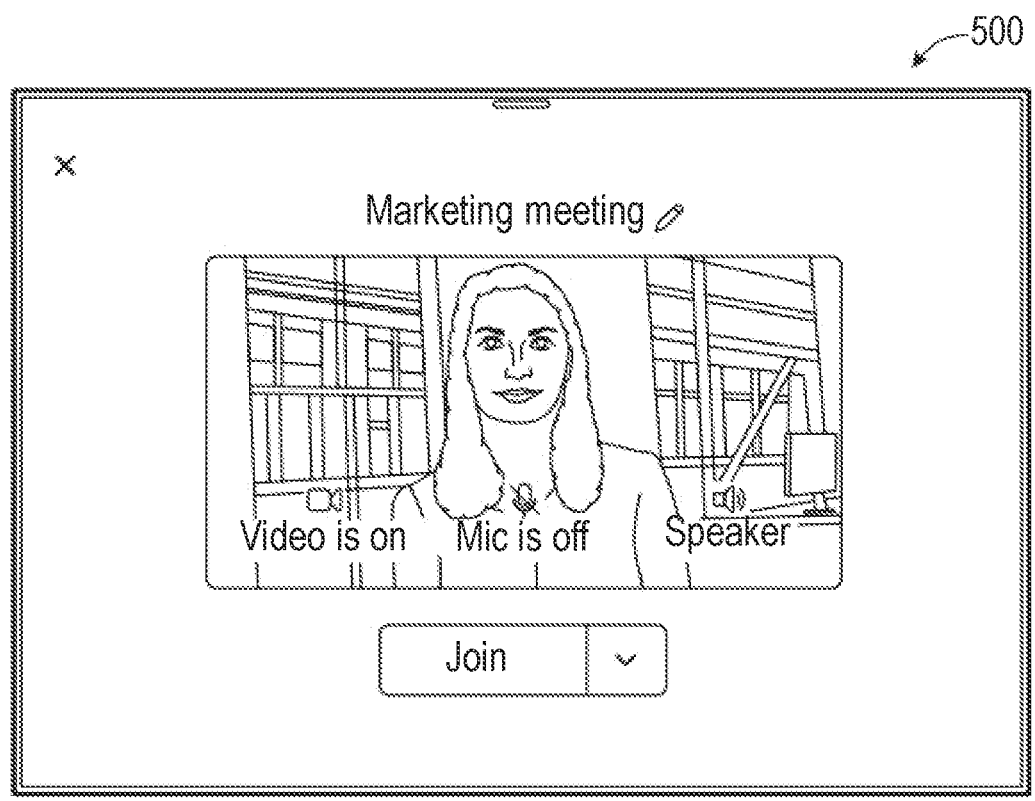
FIGS. 5A-5C illustrate examples of GUI displays for operations available from the home screen of the shared hot desk device in accordance with aspects of the present disclosure.
Figure 5B:
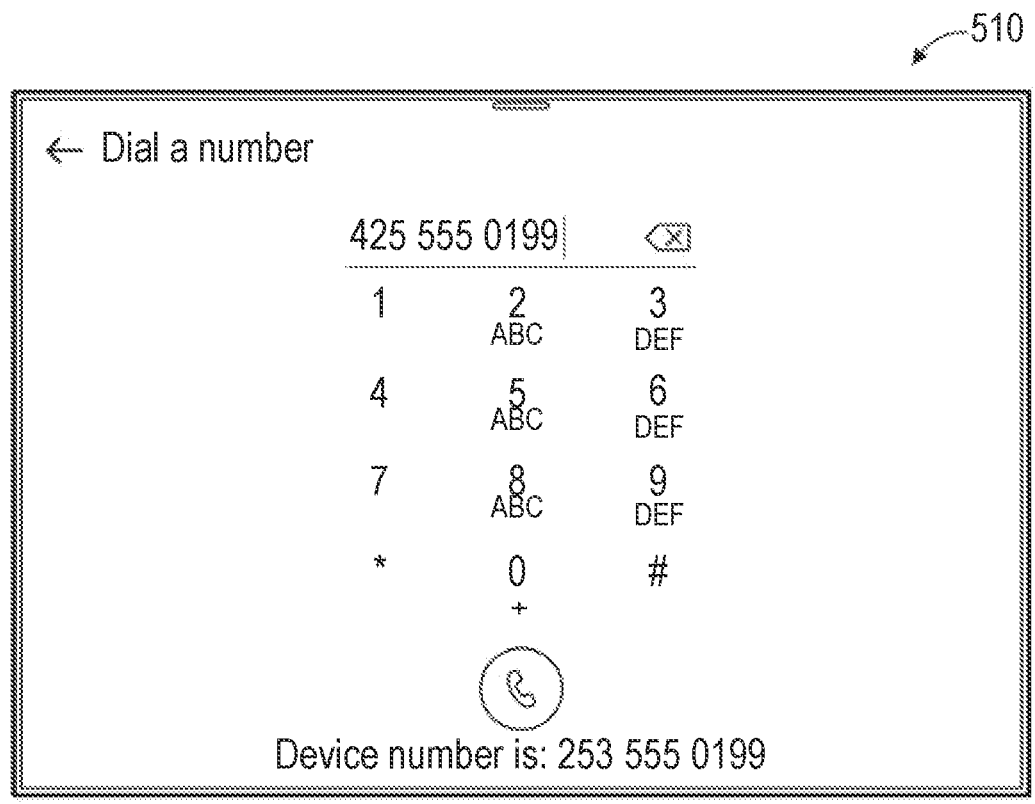
Figures 5C, 6A:
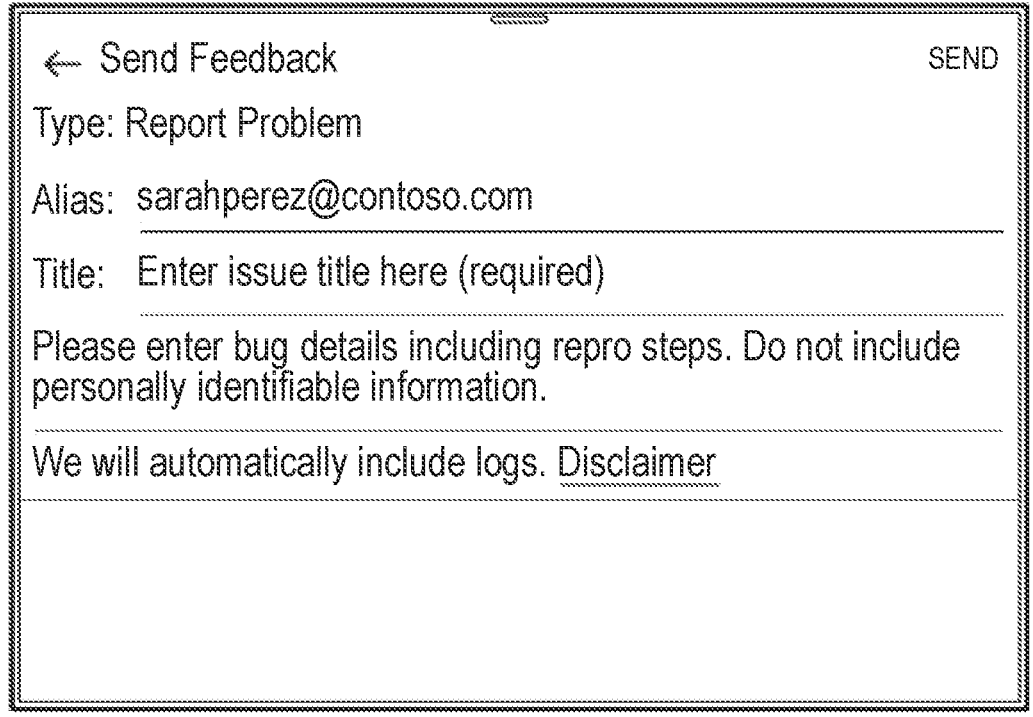
FIGS. 6A and 6B illustrate examples of GUI displays on the shared hot desk device for signing in and using the shared hot desk device during the predetermined reservation period in accordance with aspects of the present disclosure.

FIGS. 5A-5C illustrate examples of GUI displays for operations available from the home screen 400 of the shared hot desk device 130 in accordance with aspects of the present disclosure, either before the user signs in, or after the user has signed into the hot desk device 130. Specifically, FIG. 5A shows an instant meetings screen 500 which is displayed when a user presses the instant meeting button 412 on the home screen 400. This allows the user to create a meeting with one click during their reserved timeslot on the hot desk device 130, even if the user has not signed in or authenticated. FIG. 5B shows a phone call screen 510 allowing a user to make a phone call on the hot desk device 130, during their reserved time period, by pressing the phone call button 414 on the home screen 400, again without the need to sign in or authenticate. FIG. 5C shows a report issue screen 520 which is shown in response to a user clicking on the report issue button 416 on the home screen 400. This allows the user to report any problems which might have occurred during their session on the hot desk device 130. In summary, all of the buttons 412, 414, 416 and 418 (settings) are available to the user either with or without signing in or authenticating.

Figure 6B:
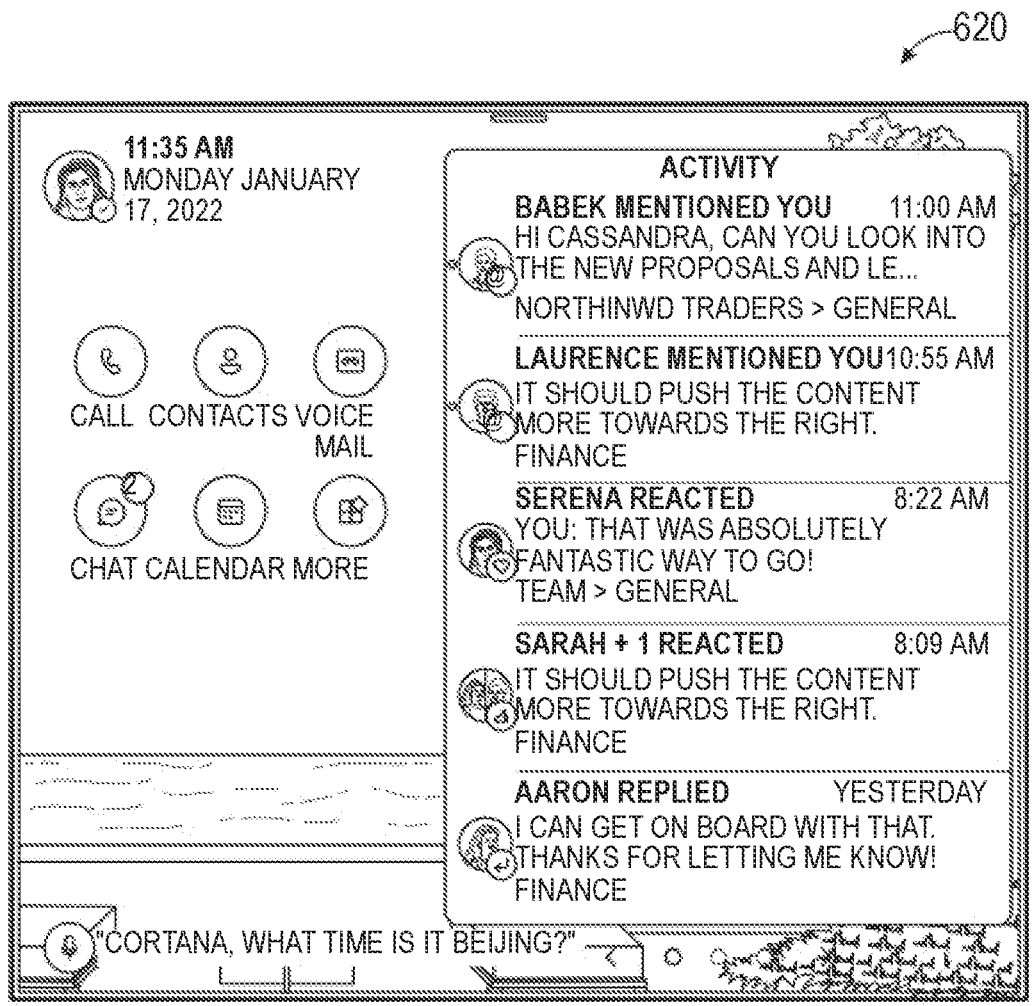

FIGS. 6A and 6B illustrate examples of GUI displays on the shared hot desk device 130 for signing in and using the shared hot desk device during the predetermined reservation period in accordance with aspects of the present disclosure. In particular, FIG. 6A shows a sign in screen 600 which is displayed on the GUI of hot desk device 130 during a time period for which a reservation has already been made. As such, a user, in this case, Sarah, can immediately sign in to use hot desk device 130 simply by clicking on the sign-in button 610 and providing appropriate credentials to verify that they are the authorized user for the reservation that has been made. Alternatively, the user can use their user device 110, if it is proximate to the hot desk device 130, to authenticate the user either using a QR code or other means to verify that they are the authorized user who made the reservation.

FIG. 6B shows an example of a resulting activity screen 620 after signing in and authentication have been completed. As discussed above, once sign in and authentication are completed by the user 10 on the hot desk device 130, the hot desk device will download a personized version of a predetermined application (e.g., Microsoft Teams™), with the user's personalized information, so that the user can interact with one-click entries (such as the instant meeting button 416 of FIG. 4A or via one of the buttons for "Call", "Contacts", "Voice Mail", "Chat", "Calendar" and "More" shown on the left side of the screen 620 shown in FIG. 6B) to carry out operations in the predetermined application, without needing a separate login to the application in question. The screen 620 of FIG. 6B shows various possible activities which the user is authorized to make on the hot desk device 130 during the reservation time in the predetermined program. This includes buttons on the left side of the screen 620 for making calls, starting chats, and accessing contacts, voicemails and their calendar information. The screen 620 also shows messaging activity, for example, on the right side of the screen 620. It is noted that, notwithstanding the one-click capabilities for the user in the predetermined application, in alternative implementations the user could be allowed to separately login to other applications with a separate login for these other applications after the initial signing into the hot desk device 130.

Figure 7A:
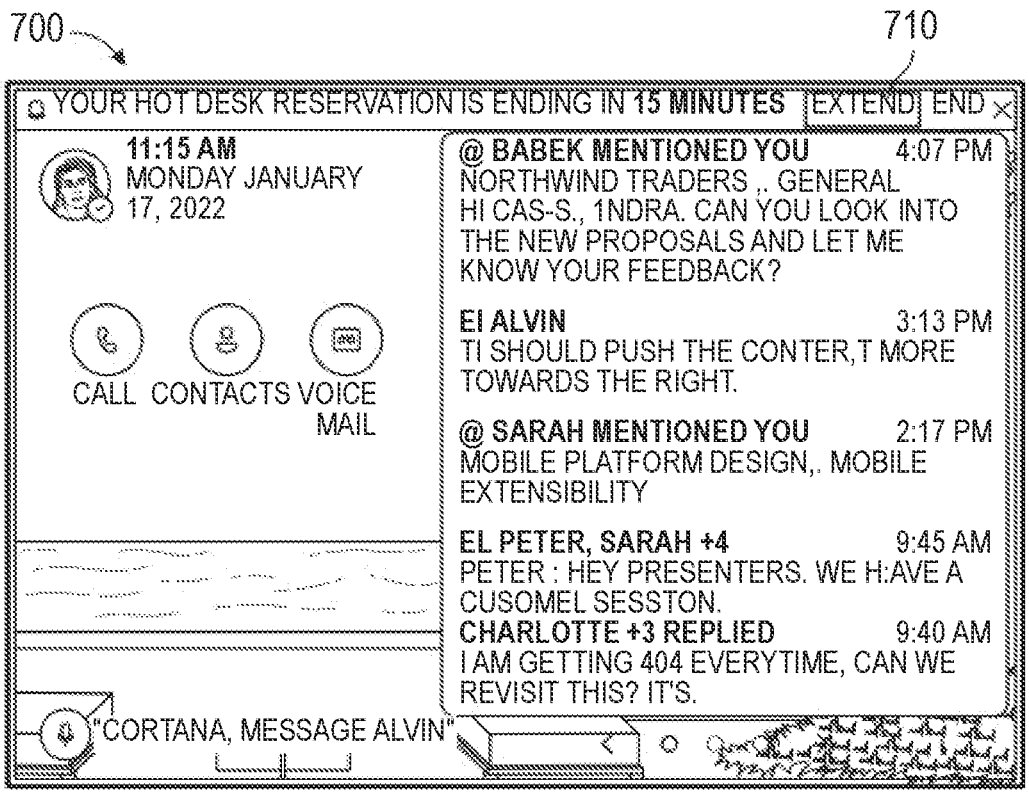
FIGS. 7A-7C illustrate examples of GUI displays on the shared hot desk device for requesting an extension of time during the predetermined reservation period in accordance with aspects of the present disclosure.
Figure 7B:
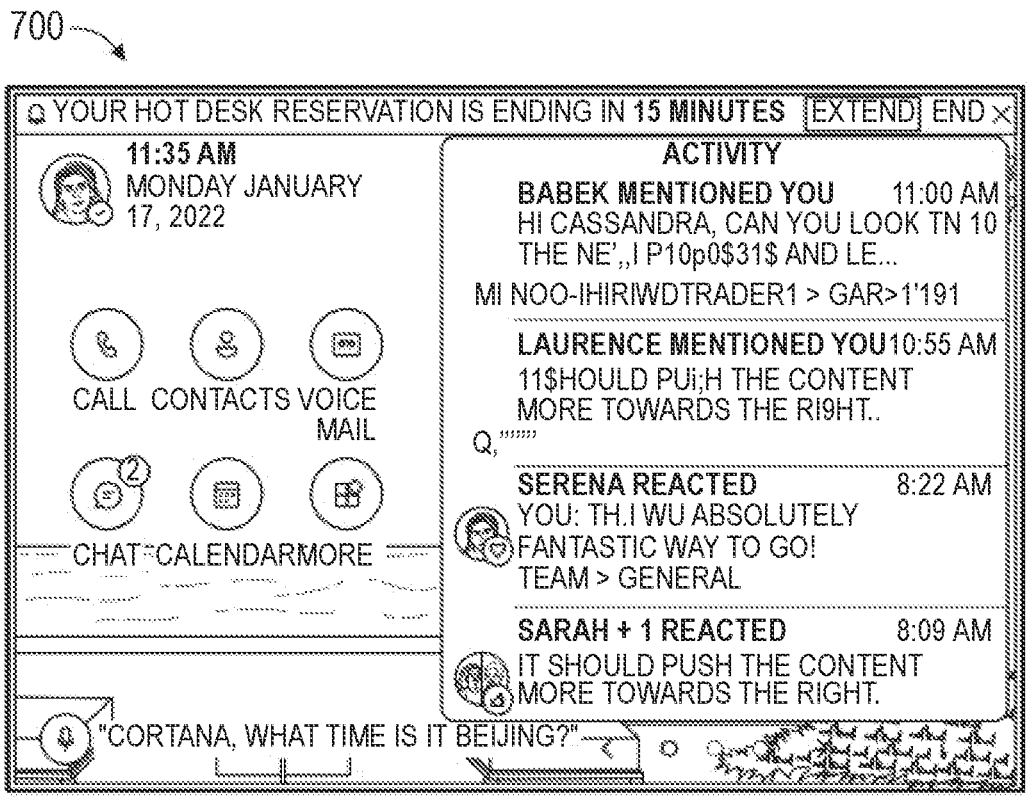
Figure 7C:
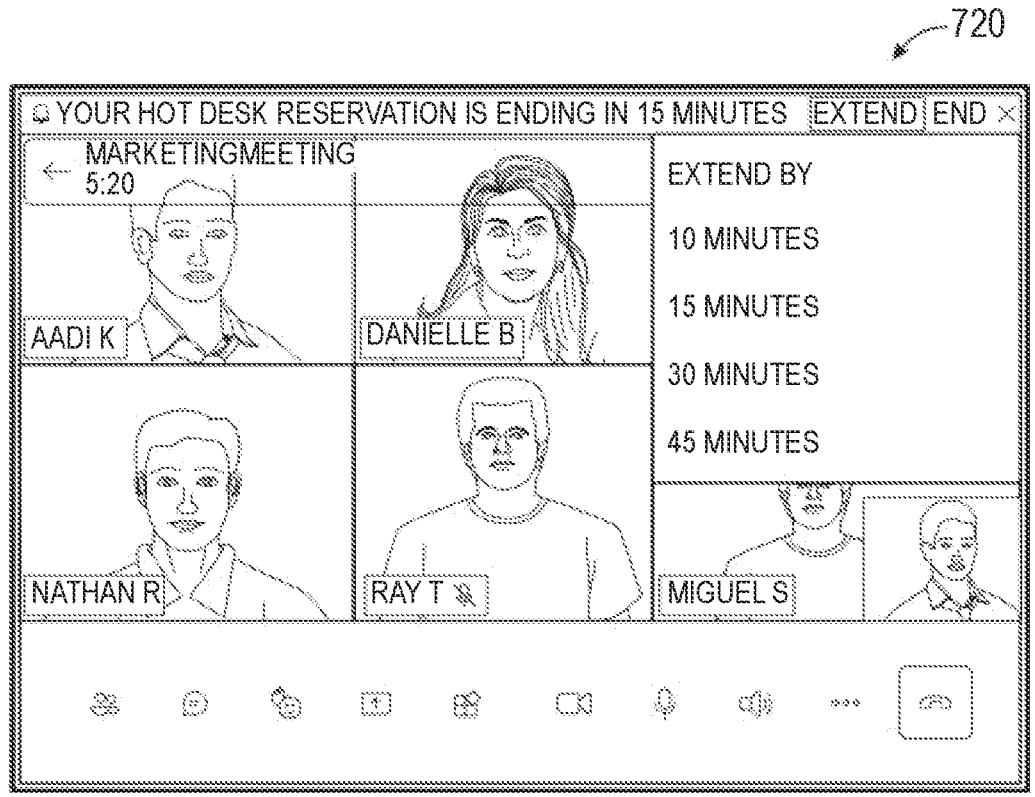

FIGS. 7A-7C illustrate examples of GUI displays on the shared hot desk device 130 for requesting an extension of time during the predetermined reservation period in accordance with aspects of the present disclosure. FIGS. 7A and 7B show an activity screen 700, similar to activity screen 600 of FIG. 6A, which shows the activity available to the user on the GUI of the hot desk device 130. This includes an extension button 710 which allows the user to request extending the time of the session of the hot desk device 130, if the next time slot is available, while they are still within the previously reserved time period. The extension button 710 will not be activated unless the next time slot is available. FIG. 7C shows a screen 720 which will be displayed in response to clicking on the extension button 710 on the screen 700 of FIGS. 7A and 7B to allow the user to select possible extension times. Once the user has selected a desired extension time, the hot desk device 130 will grant the extension request accordingly, as discussed above with regard to steps 260 and 270 of FIG. 2.

Following is a discussion of some use scenarios as examples of using the system and methods discussed herein. John, an outside vendor who is registered on a Global Address List for Microsoft Teams™, is attending an offsite office without his laptop. He has a few calls back-to-back later in the afternoon of his visit. Since it is inconvenient to be on his mobile device for long hours, John reserves an empty hot desk device nearby in his customer's office from his Microsoft Teams™ mobile app in the morning of his visit (noting, of course, that the hot desk device is configured to utilize Microsoft Teams™). John walks to the hot desk device that he has reserved for his meeting and pairs his Bluetooth headset with the hot desk device for his call. He signs into the hot desk device 130 and has access to his calendar data which is downloaded from the server 120 once he has signed in. He is now able to join the meetings with one click join from a familiar Microsoft Teams' interface with reliable, high-quality audio/video provided by the hot desk device 130. The call seems to be running over and the hot desk device 130 informs him that his hot desking session is about to end. In accordance with aspects of the present disclosure, he is able to extend his hot desking session while he is still on the call, using the operations discussed above, if the next time slot is available for the extension. After the meeting has ended, he ends his hot desking session. This automatically signs him out of the hot desk device 130, and he feels safe knowing his information, temporarily downloaded from the server 120 for his reserved session, is no longer available on the shared hot desk device 130. It is noted that these same operations can be achieved by anyone, including both employees and non-employees, such as vendors, who may be on the Global Address List for the Microsoft Teams' account that the hot desk device 130 is a part of. It is also noted that, even if an outside party is not on the Global Address List, they can still reserve the hot desk device 130. However, in this latter scenario, the reservation may just show up for them as being a guest, and they will not get an invite to their respective calendar.

In another use scenario, Bianca has signed into her reserved hot desking space 130 for the day and connected her desktop with her personal device 110 using Microsoft Better Together™. While signing into the hot desking session, she was prompted to set up a pin for her session. When stepping out for a coffee break, she quickly locks her personal device 110, and this automatically locks her reserved hot desking device 130 as well. When she returns from her break, she unlocks the hot desk desktop 130 and it unlocks her personal device 110 as well.

In a further use scenario, Adele works as a Call Centre representative who works the morning shift at her company. She has hot-desked into an office space for the duration of her shift. Since it is not a very busy day for customer calls, she decides to leave early and catch up on some errands. As Adele would not be returning to her desk for the rest of the day, she not only signs-out her hot-desking session but also ensures she clicks on a "Release Room" option on the hot desk device 130 so that her colleagues can book the same space on the hot desk device 130.

Figure 8:
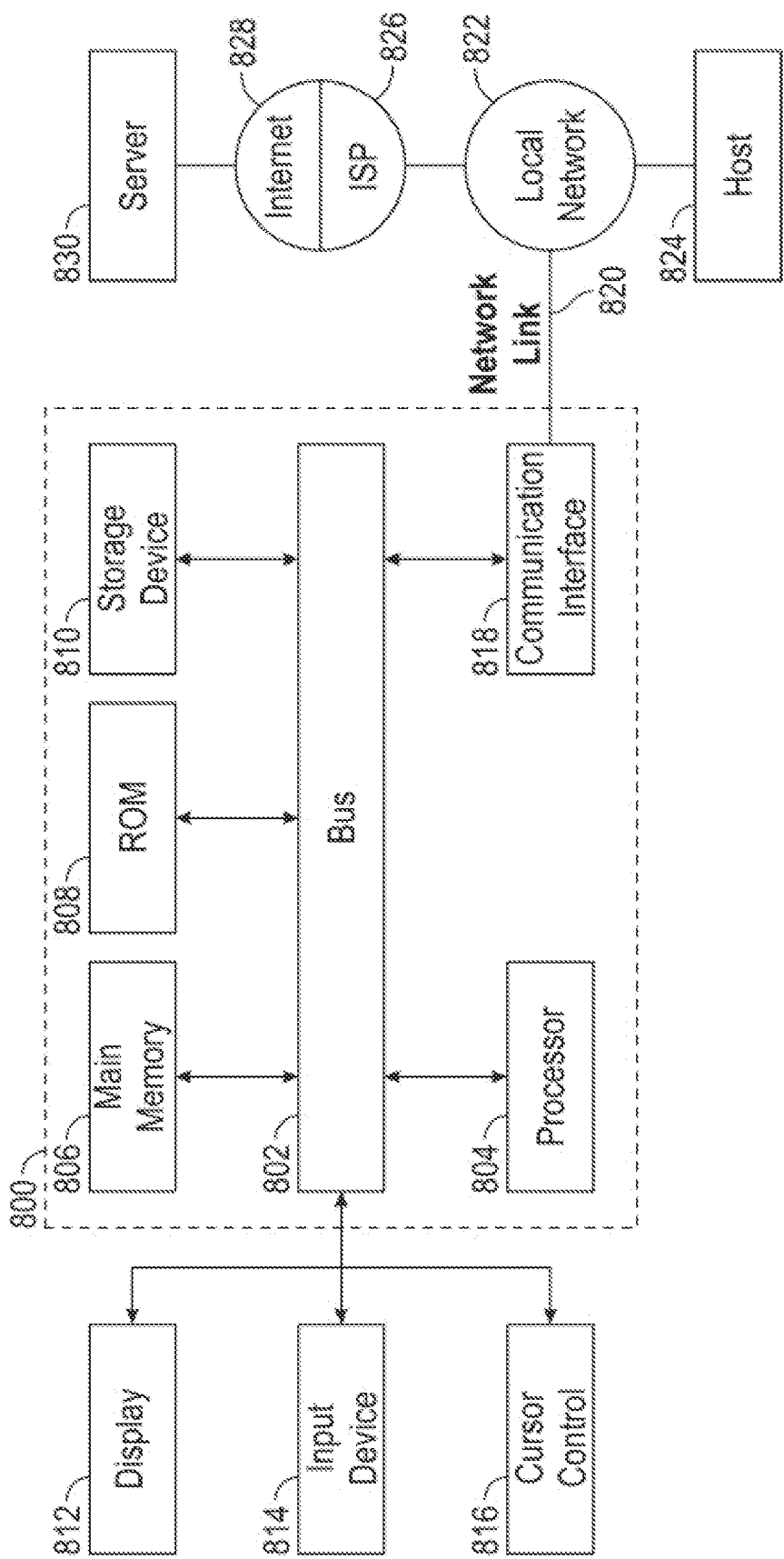
FIG. 8 is a block diagram showing an example computer system upon which aspects of this disclosure may be implemented.

FIG. 8 is a block diagram showing an example a computer system 800 upon which aspects of this disclosure may be implemented. The computer system 800 may include a bus 802 or other communication mechanism for communicating information, and a processor 804 coupled with the bus 802 for processing information. The computer system 800 may also include a main memory 806, such as a random-access memory (RAM) or other dynamic storage device, coupled to the bus 802 for storing information and instructions to be executed by the processor 804. The main memory 806 may also be used for storing temporary variables or other intermediate information during execution of instructions to be executed by the processor 804. The computer system 800 may implement, for example, the user device 110, the server 120 and the shared hot desk device 130.

The computer system 800 may further include a read only memory (ROM) 808 or other static storage device coupled to the bus 802 for storing static information and instructions for the processor 804. A storage device 810, such as a flash or other non-volatile memory may be coupled to the bus 802 for storing information and instructions.

The computer system 800 may be coupled via the bus 802 to a display 812, such as a liquid crystal display (LCD), for displaying information. One or more user input devices, such as the example user input device 814 may be coupled to the bus 802, and may be configured for receiving various user inputs, such as user command selections and communicating these to the processor 804, or to the main memory 806. The user input device 814 may include physical structure, or virtual implementation, or both, providing user input modes or options, for controlling, for example, a cursor, visible to a user through display 812 or through other techniques, and such modes or operations may include, for example virtual mouse, trackball, or cursor direction keys.

The computer system 800 may include respective resources of the processor 804 executing, in an overlapping or interleaved manner, respective program instructions. Instructions may be read into the main memory 806 from another machine-readable medium, such as the storage device 810. In some examples, hard-wired circuitry may be used in place of or in combination with software instructions. The term "machine-readable medium" as used herein refers to any medium that participates in providing data that causes a machine to operate in a specific fashion. Such a medium may take forms, including but not limited to, non-volatile media, volatile media, and transmission media. Non-volatile media may include, for example, optical or magnetic disks, such as storage device 810. Transmission media may include optical paths, or electrical or acoustic signal propagation paths, and may include acoustic or light waves, such as those generated during radio-wave and infra-red data communications, which are capable of carrying instructions detectable by a physical mechanism for input to a machine.

The computer system 800 may also include a communication interface 818 coupled to the bus 802, for two-way data communication coupling to a network link 820 connected to a local network 822. The network link 820 may provide data communication through one or more networks to other data devices. For example, the network link 820 may provide a connection through the local network 822 to a host computer 824 or to data equipment operated by an Internet Service Provider (ISP) 826 to access through the Internet 828 a server 830, for example, to obtain code for an application program.

In the following, further features, characteristics and advantages of the invention will be described by means of items:

Item 1. A shared computer device which includes a processor and a computer-readable medium in communication with the processor and storing instructions that, when executed by the processor, cause the processor to perform: receiving a reservation request associated with a user at the shared computer device to reserve a predetermined period of time for usage of the shared computer device; receiving an input from the user on the shared computer device during the predetermined period of time to sign in to and use the shared computer device to access and use a predetermined application; based on the signing in, downloading, from a server, predetermined personal information of the user stored in the server regarding the predetermined application and granting access to the user to use the predetermined application on the shared computer device during the predetermined period of time using the downloaded personal information of the user; and deleting the personal information of the user from the shared computer device after the predetermined period of time expires.

Item 2. The shared computer device of item 1, wherein signing into the shared computer device provides the user with one-click access to services and capabilities of the predetermined application on the shared computer device.

Item 3. The shared computer device of items 1 or 2, wherein the reservation request is received from a first device associated with the user, and the reservation request is made on an application on the first device which includes calendar capabilities and/or meeting scheduling capabilities.

Item 4. The shared computer device of any of items 1-3, wherein an input from the user to authenticate the user's identity during sign in to use the shared computer device is provided from a QR code on the first device during the predetermined period of time.

Item 5. The shared computer device of any of items 1-4, wherein the input from the user to authenticate the user to the shared computer device is provided by the shared computer device detecting physical proximity of the first device of the user during the predetermined period of time, and wherein the first device and the shared computer device are paired during the predetermined period of time while they are in physical proximity to one another.

Item 6. The shared computer device of any of items 1-5, wherein the instructions, when executed by the processor, cause the processor to perform using an artificial intelligence machine learning model, based on previous interactions of the user with the shared computer device, to make suggestions to the user regarding details of making a reservation in response to receiving the reservation request from the user.

Item 7. The shared computer device of any of items 1-6, wherein the details of the reservation include at least one of possible preferred reservation times and possible seating preferences relative to the shared computer device.

Item 8. The shared computer device of any of items 1-7, wherein the instructions, when executed by the processor, cause the processor to perform receiving an extension request by the user, during the predetermined period of time, to extend the predetermined period of time by an additional period of time in response to an indication by the shared user device that additional time is available for extension at the end of the predetermined period of time, and granting the extension request and extending the predetermined period of time by the additional period of time if the additional period of time is not already reserved.

Item 9. The shared computer device of any of items 1-8, wherein the instructions, when executed by the processor, cause the processor to perform locking the shared computer device in response to detecting that the first device has been locked during the predetermined period of time.

Item 10. The shared computer device of any of items 1-9, wherein the user can sign in and authenticate to use the shared computer device during the predetermined period of time while the first device is out of proximity to the shared computer device.

Item 11. The shared computer device of any of items 1-10, wherein the reservation request is received on the shared computer device.

Item 12. A method performed by a shared computer device including steps of receiving a reservation request associated with a user at the shared computer device to reserve a predetermined period of time for usage of the shared computer device, receiving an input from the user on the shared computer device during the predetermined period of time to sign in to and use the shared computer device to access and use a predetermined application, based on the signing in, downloading, from a server, predetermined personal information of the user stored in the server regarding the predetermined application and granting access to the user to use the predetermined application on the shared computer device during the predetermined period of time using the downloaded personal information of the user, and deleting the personal information of the user from the shared computer device after the predetermined period of time expires.

Item 13. The method of item 12, wherein signing into the shared computer device provides the user with one-click access to services and capabilities of the predetermined application on the shared computer device.

Item 14. The method of item 12 or 13, wherein the reservation request is received from a first device associated with the user, and the reservation request is made on an application on the first device which includes calendar capabilities and/or meeting scheduling capabilities.

Item 15. The method of any of items 12-14, wherein an input from the user to authenticate the user's identity during sign in to use the shared computer device is provided from a QR code on the first device during the predetermined period of time.

Item 16. The method of any of items 12-15, wherein the input from the user to authenticate the user to use the shared computer device is provided by the shared computer device detecting physical proximity of the first device of the user during the predetermined period of time, and wherein the first device and the shared computer device are paired during the predetermined period of time while they are in physical proximity to one another.

Item 17. The method of any of items 12-16, further including using an artificial intelligence machine learning model, based on previous interactions of the user with the shared computer device, to make suggestions to the user regarding details of making a reservation in response to receiving the reservation request from the user.

Item 18. The method of any of items 12-17, further including using an artificial intelligence machine learning model, based on previous interactions of the user with the shared computer device, to make suggestions to the user regarding details of making a reservation in response to receiving the reservation request from the user.

Item 19. The method of any of items 12-18, further including receiving an extension request by the user, during the predetermined period of time, to extend the predetermined period of time by an additional period of time in response to an indication by the shared user device that additional time is available for extension at the end of the predetermined period of time, and deleting the personal information of the user from the shared computer device after the predetermined period of time expires.

Item 20. A non-transitory computer-readable medium including instructions that, when executed by a processor, cause the processor to control a system to perform functions of receiving a reservation request associated with a user at the shared computer device to reserve a predetermined period of time for usage of the shared computer device, receiving an input from the user on the shared computer device during the predetermined period of time to sign in to and use the shared computer device to access and use a predetermined application, based on the signing in, downloading, from a server, predetermined personal information of the user stored in the server regarding the predetermined application and granting access to the user to use the predetermined application on the shared computer device during the predetermined period of time using the downloaded personal information of the user, wherein signing into the shared computer device provides the user with one-click access to services and capabilities of the predetermined application on the shared computer device, and deleting the personal information of the user from the shared computer device after the predetermined period of time expires.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A shared computer device comprising:
a processor; and
a non-transitory computer-readable medium in communication with the processor and storing instructions that, when executed by the processor, cause the processor to perform:
receiving a reservation request associated with a user at the shared computer device to reserve a predetermined reserved period of time for usage of the shared computer device;
receiving an input from a first device of the user on the shared computer device during the predetermined reserved period of time to sign in to and use the shared computer device to access and use a predetermined application;

based on the signing in, downloading, from a server, predetermined personal information of the user stored in the server regarding the predetermined application and granting access to the user to use the predetermined application on the shared computer device during the predetermined reserved period of time using the downloaded personal information of the user; and deleting the personal information of the user from the shared computer device after the predetermined reserved period of time for usage of the shared computer device expires, wherein:

the input from the first device to authenticate the user to the shared computer device is provided by the shared computer device detecting physical proximity of the first device of the user during the predetermined reserved period of time;

the first device and the shared computer device are paired during the predetermined reserved period of time while they are in physical proximity to one another;

the input is provided from a QR code on the first device during the predetermined reserved period of time;

the QR code is obtained by the first device by scanning a display of the QR code on the shared computer device during the predetermined reserved period of time; and the input comprises an access code included in the QR code and entered into the shared computer device by the user during the predetermined period of time to confirm the physical proximity of the first device of the user to the shared computer device after the user determines the access code based on scanning the QR code displayed by the shared computer device.

2. The shared computer device of claim 1, wherein signing into the shared computer device provides the user with one-click access to services and capabilities of the predetermined application on the shared computer device.

3. The shared computer device of claim 1, wherein the reservation request is received from a first device associated with the user, and the reservation request is made on an application on the first device which includes calendar capabilities and/or meeting scheduling capabilities.

4. The shared computer device of claim 1, wherein the instructions, when executed by the processor, cause the processor to perform using an artificial intelligence machine learning model, based on previous interactions of the user with the shared computer device, to make suggestions to the user regarding details of making a reservation in response to receiving the reservation request from the user.

5. The shared computer device of claim 4, wherein the details of the reservation include at least one of possible preferred reservation times and possible seating preferences relative to the shared computer device.

6. The shared computer device of claim 1, wherein the instructions, when executed by the processor, cause the processor to perform:

receiving an extension request from the user, during the predetermined reserved period of time, to extend the predetermined reserved period of time by an additional period of time in response to an indication by the shared computer device that additional time is available for extension at an end of the predetermined reserved period of time; and granting the extension request and extending the predetermined reserved period of time by the additional period of time if the additional period of time is not already reserved.

7. The shared computer device of claim 3, wherein the instructions, when executed by the processor, cause the processor to perform locking the shared computer device in response to detecting that the first device has been locked during the predetermined reserved period of time.

8. The shared computer device of claim 3, wherein the user can sign in and authenticate to use the shared computer device during the predetermined reserved period of time while the first device is out of proximity to the shared computer device.

9. The shared computer device of claim 1, wherein the reservation request is received on the shared computer device.

10. A method performed by a shared computer device comprising:

receiving a reservation request associated with a user at the shared computer device to reserve a predetermined reserved period of time for usage of the shared computer device;

receiving an input from the user on the shared computer device during the predetermined reserved period of time to sign in to and use the shared computer device to access and use a predetermined application;

based on the signing in, downloading, from a server, predetermined personal information of the user stored in the server regarding the predetermined application and granting access to the user to use the predetermined application on the shared computer device during the predetermined reserved period of time using the downloaded personal information of the user; and deleting the personal information of the user from the shared computer device after the predetermined reserved period of time for usage of the shared computer device expires, wherein:

signing into the shared computer device provides the user with one-click access to services and capabilities of the predetermined application on the shared computer device; and the predetermined application on the shared computer device is a meeting application including a calendar user interface (UI), and wherein the one-click access permits creating and joining meetings with one-click without having to sign in again to the meeting application.

11. The method of claim 10, wherein the reservation request is received from a first device associated with the user, and the reservation request is made on an application on the first device which includes calendar capabilities and/or meeting scheduling capabilities.

12. The method of claim 11, wherein the input from the user is provided from a QR code on the first device during the predetermined reserved period of time.

13. The method of claim 11, wherein the input from the user to authenticate the user to use the shared computer device is provided by the shared computer device detecting physical proximity of the first device of the user during the predetermined reserved period of time, and wherein the first device and the shared computer device are paired during the predetermined reserved period of time while they are in physical proximity to one another.

14. The method of claim 13, further comprising using an artificial intelligence machine learning model, based on previous interactions of the user with the shared computer device, to make suggestions to the user regarding details of making a reservation in response to receiving the reservation request from the user.

15. The method of claim 14, wherein the details of the reservation include at least one of possible preferred reservation times and possible seating preferences relative to the shared computer device.

16. The method of claim 10, further comprising:
receiving an extension request from the user, during the predetermined reserved period of time, to extend the predetermined reserved period of time by an additional period of time in response to an indication by the shared computer device that additional time is available for extension at an end of the predetermined reserved period of time; and
granting the extension request and extending the predetermined reserved period of time by the additional period of time if the additional period of time is not already reserved.

17. A non-transitory computer-readable medium comprising instructions that, when executed by a processor, cause the processor to control a system to perform functions comprising:
receiving a reservation request associated with a user at a shared computer device to reserve a predetermined reserved period of time for usage of the shared computer device;
receiving an input from the user on the shared computer device during the predetermined reserved period of time to sign in to and use the shared computer device to access and use a predetermined application;
based on the signing in, downloading, from a server, predetermined personal information of the user stored in the server regarding the predetermined application and granting access to the user to use the predetermined application on the shared computer device during the predetermined reserved period of time using the downloaded personal information of the user, wherein signing into the shared computer device provides the user with one-click access to services and capabilities of the predetermined application on the shared computer device; and
deleting the personal information of the user from the shared computer device after the predetermined reserved period of time for usage of the shared computer device expires,
wherein:
signing into the shared computer device provides the user with one-click access to services and capabilities of the predetermined application on the shared computer device; and
the predetermined application on the shared computer device is a meeting application including a calendar user interface (UI), and wherein the one-click access permits creating and joining meetings with one-click without having to sign in again to the meeting application.

18. The shared computer device of claim 2, wherein the predetermined application on the shared computer device is a meeting application including a calendar user interface (UI), and wherein the one-click access permits creating and joining meetings with one-click without having to sign in again to the meeting application.

19. The method of claim 10, wherein the one-click access to the predetermined application is provided to the user based on receiving an input of a user identifier from the user on an access list screen displayed on the shared user device, determining if the user identifier is on an access list of users allowed to access the predetermined application, and authorizing the one-click access to the user if the user identifier is on the access list.

20. The method of claim 19, wherein the user identifier is a name of the user.

21. The method of claim 19, wherein, in response to determining that the user is authorized to access the predetermined application, and downloading a version of the predetermined application that is personalized for the user to include the personal information of the user which allows the user to utilize features of the predetermined application with one-click access.

* * * * *